(No Model.)
H. WATTS.
TWO WHEELED VEHICLE.
No. 275,965. Patented Apr. 17, 1883.
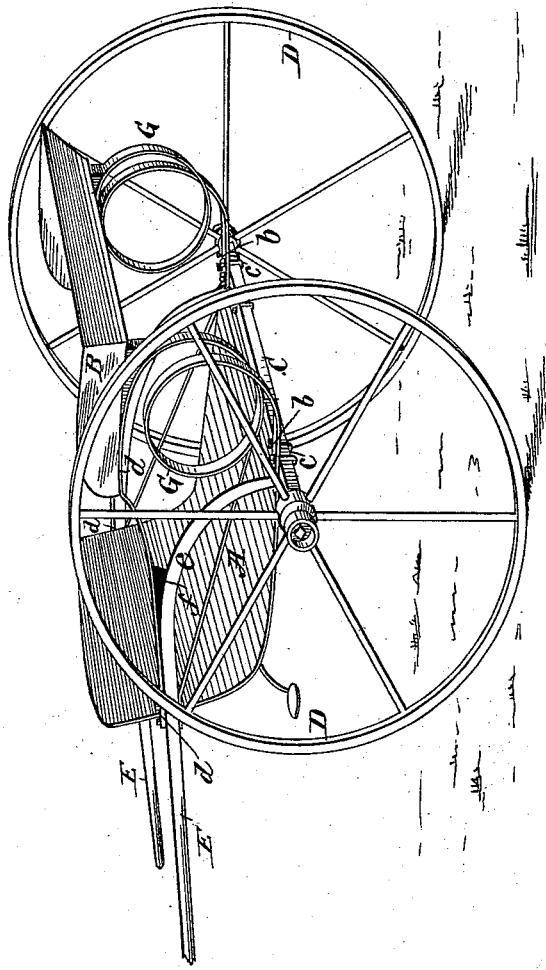
WITNESSES:
INVENTOR:
BY
ATTORNEYS.

UNITED STATES PATENT OFFICE.

HARRY WATTS, OF KNIGHTSTOWN, INDIANA.

TWO-WHEELED VEHICLE.

SPECIFICATION forming part of Letters Patent No. 275,965, dated April 17, 1883.

Application filed February 15, 1883. (No model.)

*To all whom it may concern:*

Be it known that I, HARRY WATTS, of Knightstown, in the county of Henry and State of Indiana, have invented a new and useful Improvement in Spring-Vehicles, of which the following is a full, clear, and exact description.

This invention, which is more particularly designed for what are termed "road-carts" and "spring-wagons," consists in a novel construction of a coiled spring or springs for support of the body or seat of the vehicle, and arrangement and attachment of the same relatively to the seat, axle, and shafts of the vehicle, together with means for varying the stiffness of the springs, whereby the objectionable action or effect on the vehicle of the back-and-forth motion of the horse's shoulder is reduced or neutralized. Increased facilities are afforded for balancing the vehicle and throwing the weight of the rider over the axle. The springs form side braces for the seat, and the action of the springs generally may be adjusted as required, substantially as hereinafter described.

Reference is to be had to the accompanying drawing, forming a part of this specification, which represents a view in perspective of a two-wheeled spring wagon or vehicle having my invention applied.

A in the drawing indicates the floor of the vehicle; B, its seat; C, the axle; D D, the running-wheels, and E E the shafts.

G G are two springs, composed of flat or other suitably-shaped steel, and constructed so that their bodies form coils about or around an axis, which, when the springs are in place, is parallel or thereabout with the axle of the vehicle. The one or lower end, $b$, of each of these coiled springs is connected with the axle C at the inner ends of the shafts E E, and secured in position with facility of adjustment by ordinary or any other suitable clips, $c\ c$. This attachment applies to the outer coil of either spring, which is outside of or laterally beyond the side of the seat, while the upper end portions, $d$, of the inner coils of the springs pass under and support the seat, and are extended forward, where they rest on and are connected with the upper portions of the shafts E E, beyond the bowed parts $e$ thereof. The coiled shape of these springs G G provides not only for an up-and-down motion but for a back-and-forth movement of them, thus preventing the objectionable action or effect of the back-and-forth motion of the horse's shoulders, or doing away with what is termed "bobbing backward and forward," when driving. The within-described arrangement, too, of the coils of the springs outside of or beyond the sides of the seat gives a perfect side brace to the seat and dispenses with other or special side braces thereto. Both ends of the springs, too, are adjustably attached to the parts with which they are connected, so that their bearings can be set back or forth in order to balance the body of the vehicle or its seat and throw the weight of the rider over the axle. This may be done by shifting the clips or other securing devices at the ends of the springs back or forth as required. Arranged under the upper long end portions $d$ of the springs, and over or on top of the bowed portions $e$ of the shafts E, are rubber or other elastic cushions $f$, which, accordingly as they are set back or forth, make the springs stiffer or more limber, as circumstances require.

Having thus fully described my invention, I claim as new and desire to secure by Letters Patent—

1. A coiled vehicle-spring, G, constructed with upper and lower forwardly-extending end portions, $b\ d$, for arrangement in relation with the shafts, axle, and seat of the vehicle, substantially as specified.

2. In combination with the seat B, axle C, and shafts E of a wheel-vehicle, the coiled springs G G, arranged so that their outer coils are exterior to the sides of the seat, essentially as and for the purposes herein set forth.

3. In combination with the seat B, axle C, and shafts E of the vehicle, the coiled springs G G, arranged with the axis of their coils parallel, or thereabout, with the axle, and adjustably attached at their ends for varying their position backward or forward beneath the seat and relatively to the axle, essentially as described.

4. The combination of the elastic cushions $f$ with the shafts E, and the adjustable coiled springs G, having upper forwardly-extended end portions, $d$, substantially as and for the purpose herein specified.

HARRY WATTS.

Witnesses:
J. LEE FURGASON,
JAS. L. SHELTON.